US006666773B1

(12) United States Patent
Richardson

(10) Patent No.: US 6,666,773 B1
(45) Date of Patent: Dec. 23, 2003

(54) DOWNHILL ZIP LINE THRILL RIDE SYSTEM

(76) Inventor: Michael Troy Richardson, 503 E. Salem Hills Dr., Elk Ridge, UT (US) 84651

( * ) Notice: Subject to any disclaimer, the term of this patent is extended or adjusted under 35 U.S.C. 154(b) by 0 days.

(21) Appl. No.: 10/385,903

(22) Filed: Mar. 10, 2003

(51) Int. Cl.[7] ............................................. A63G 31/02
(52) U.S. Cl. ........................ 472/49; 472/131; 104/204
(58) Field of Search .......................... 472/49, 50, 131, 472/136, 137; 104/113, 202, 204, 211, 212, 213, 219, 238

(56) References Cited

U.S. PATENT DOCUMENTS

| | | | | |
|---|---|---|---|---|
| 1,571,096 A | * | 1/1926 | Rambin et al. ................ | 182/11 |
| 1,859,180 A | * | 5/1932 | Thiel ........................... | 104/113 |
| 3,070,035 A | * | 12/1962 | Russo et al. ................. | 104/113 |
| 3,218,988 A | * | 11/1965 | Gaston et al. ............... | 104/191 |
| 4,062,293 A | * | 12/1977 | Davis .......................... | 104/113 |
| 4,934,277 A | * | 6/1990 | Smith et al. ................. | 104/113 |
| 5,224,425 A | * | 7/1993 | Remington ................... | 104/53 |
| 5,853,331 A | * | 12/1998 | Ishikawa et al. ............. | 472/88 |
| 5,904,099 A | * | 5/1999 | Danneker .................... | 104/53 |

* cited by examiner

*Primary Examiner*—Kien T. Nguyen
(74) *Attorney, Agent, or Firm*—Angus C. Fox, III

(57) ABSTRACT

A zip line thrill ride system includes a cable suspended between a upper cable support tower and platform which, together, function as the harnessing, loading, and take-off point for the ride, and a lower cable support tower and platform which, together, function as the landing, unloading and unharnessing point of the ride. Multiple, substantially identical trolleys are designed to quickly engage and disengage the cable. The trolley includes a frame of generally I-beam cross section, a generally tubular brake retainer, having a longitudinal slit therein, is welded to an upper rear portion of the frame. A grooved, generally cylindrical brake fabricated from a durable polymeric material is rotatably affixed within the tubular brake retainer. When the trolley is affixed to the suspended cable by sliding the cable into the slit and rotating the brake, the grooved insert rides against the suspended cable and generates friction.

20 Claims, 9 Drawing Sheets

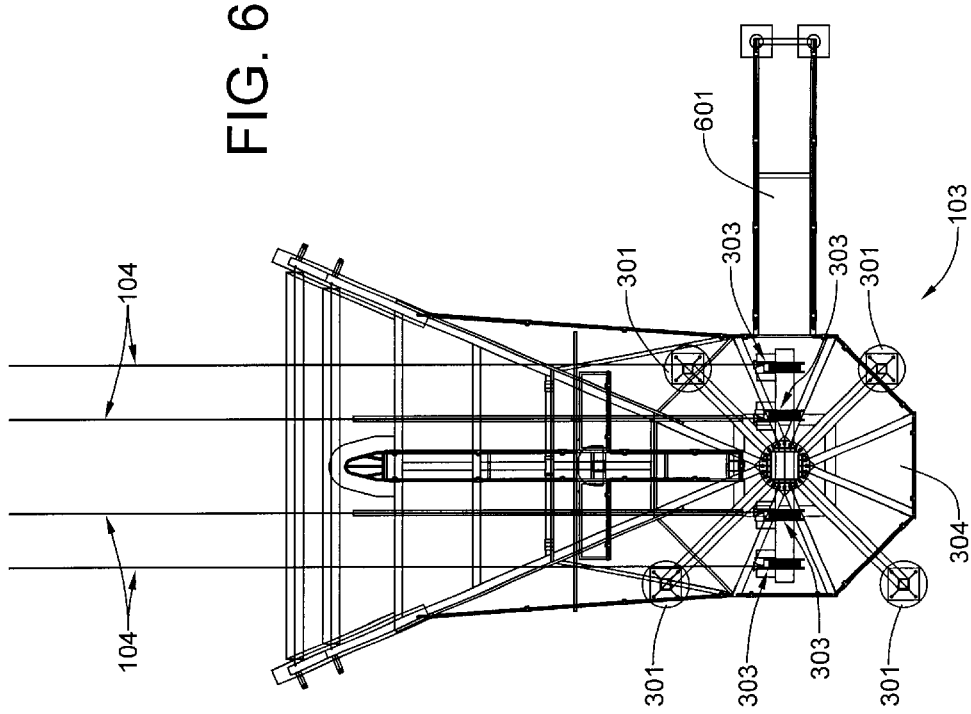
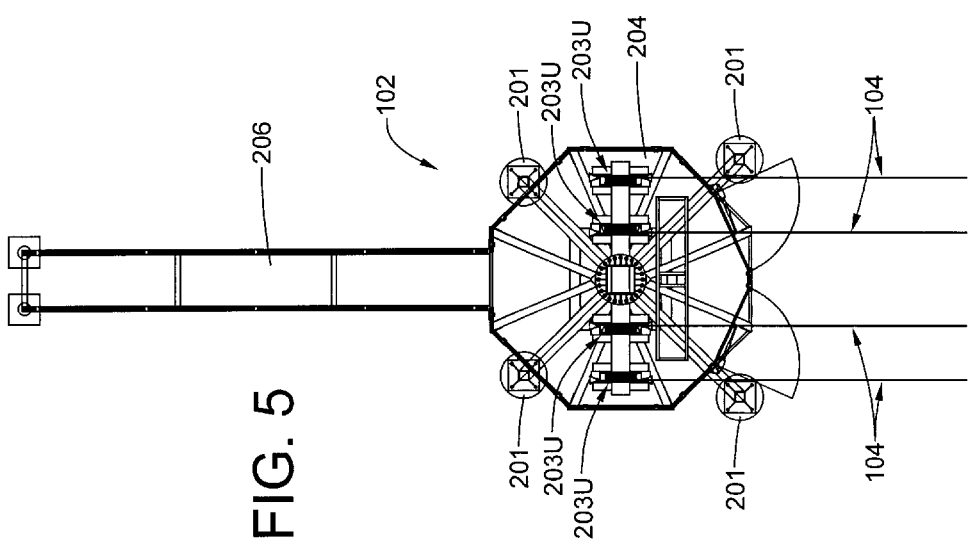

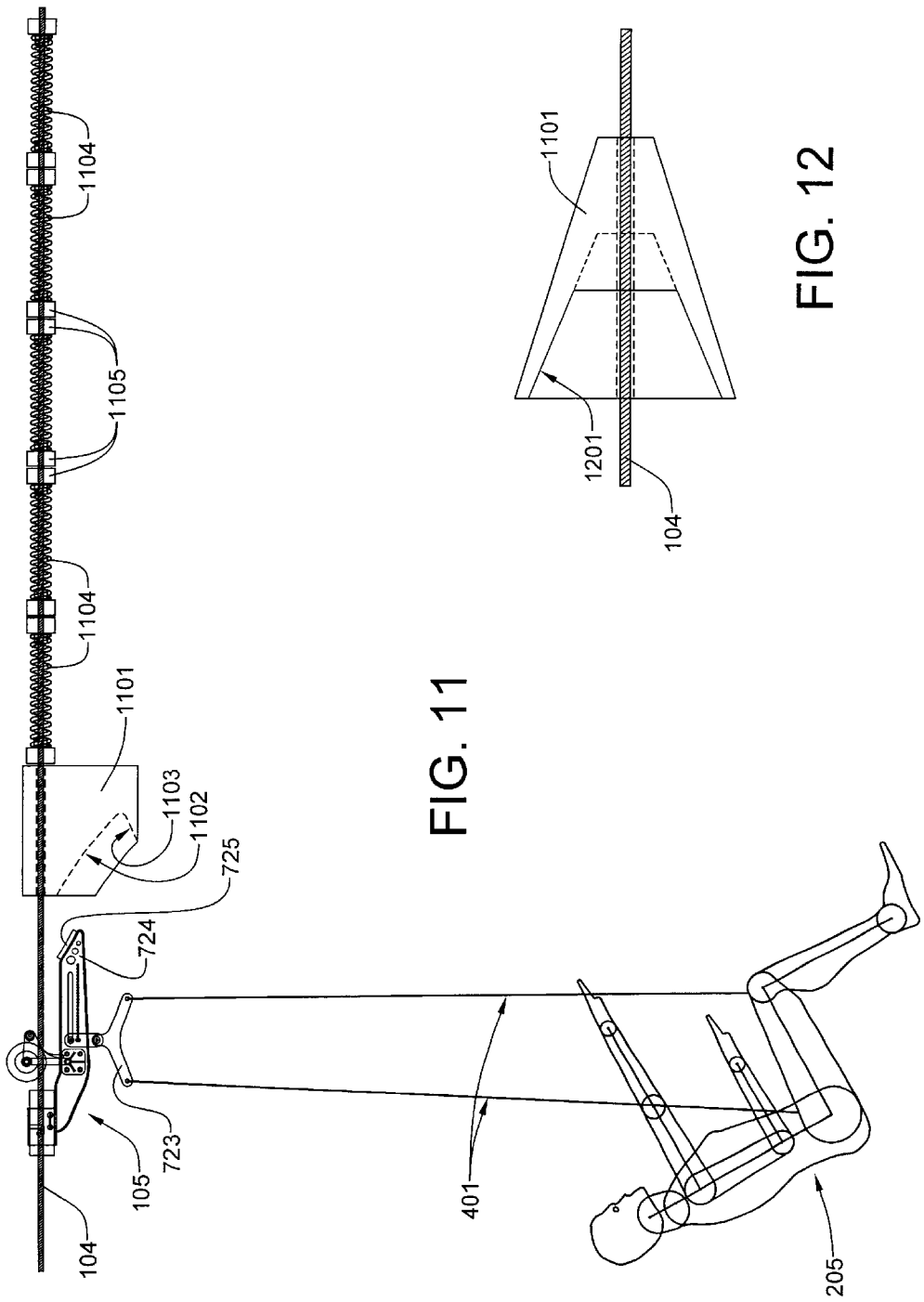

DOWNHILL ZIP LINE THRILL RIDE SYSTEM

FIELD OF THE INVENTION

This invention relates, generally, to suspended cable transport systems commonly known as zip lines and, more particularly, to trolleys for downhill zip line systems which are securely attached to the suspended cable and are designed to control maximum descent speed within a safe range.

BACKGROUND OF THE INVENTION

Transport systems involving a trolley slidable along a suspended length of cable have been known in the art for many years. Commonly known as zip lines, such systems are extensively used for rescue work on ski lift equipment. They are also available as backyard toys for children and adults. Spring Swings, Inc. of Riviera Beach, Fla., manufactures a Fun Ride Deluxe Zip Line kit which can be installed between two trees or other suitable cable supports. The kit includes enough stranded steel aircraft cable for a ride of about 21 meters (70 feet) in length, cable tensioning devices, and a "super tough" double-pulley plastic trolley which travels bidirectionally on the suspended cable. The kit retails for less than $100.

Within the past decade, zip lines have become part of the "extreme sports" scene. One particular zip line installed on a hill in the Costa Rican jungle has been given rave reviews. The Costa Rican system is really quite primitive, having a trolley with a single deep-groove nylon pulley riding on the suspended cable. In order to slow his descent, a rider must twist the trolley, thereby causing the flanges of the pulley to rub against the cable and generate friction. Kinetic energy is, thus, dissipated as heat. Riders who are particularly heavy may generate so much friction and related heat that the trolley pulley may fail prematurely. Such a system is potentially dangerous, as the riders, themselves, must take responsibility for maintaining their descent speeds within a safe range, in order to avoid smashing into the lower cable support tower. In the absence of a legal system which demands that even the most risk-inclined, incompetent and moronic individuals be protected from themselves, such a zip line system might operate in perpetuity. However, in a country such as the U.S., the slip and fall plaintiffs' bar would kill it almost immediately.

Within the past year, a sophisticated, safe, and thoroughly-engineered zip line thrill ride was installed on a steep hill at Park City, Utah. The suspended cable is about 805 meters in length (0.5 mile), and the vertical drop is approximately 183 meters (600 feet). Although maximum speeds in excess of 90 m.p.h. are attainable on the system, the maximum speed experienced by paying riders is automatically limited by the equipment to no more than about 55 m.p.h. Certain components and features of this modern zip line system are the subjects of this patent.

SUMMARY OF THE INVENTION

The zip line thrill ride system that is the focus of this invention includes a cable suspended between a upper cable support tower and platform which, together, function as the harnessing, loading, and take-off point for the ride, and a lower cable support tower and platform which, together, function as the landing, unloading and unharnessing point of the ride. Multiple, substantially identical trolleys are designed to quickly engage and disengage the cable. A safety lock actuated by ride operator personnel at the loading point prevents the trolley from being removed from the cable until it is unlocked at the unloading point by ride operator personnel at the landing point. The trolley, the structural components of which are fabricated almost entirely from stainless steel, includes a frame of generally I-beam cross section fabricated from metal plate stock. A generally tubular brake retainer, having a longitudinal slit therein, is welded to an upper rear portion of the frame. A grooved, generally cylindrical brake fabricated from a durable polymeric material, such as Teflon®, nylon, or high-density polyethylene, high density polyethylene (HDPE) brake, is rotatably affixed within the tubular brake retainer. When the trolley is affixed to the suspended cable, the grooved insert rides against the suspended cable and functions as a brake. A clevis/handle assembly is bolted to a central portion of the frame. A pulley is rotatably mounted within the clevis. The clevis bracket of the clevis/handle assembly is positioned so that a lower portion of the pulley is exposed.

In order to attach the trolley to the suspended cable, the brake is rotated so that its groove coincides with the slit of the tubular brake retainer. The trolley is then positioned below and oblique or perpendicular to the suspended cable. The trolley is then elevated so that the cable enters the gap between the brake retainer and the clevis/handle assembly. Once the cable is positioned below the level of the pulley flanges, the trolley is rotated so that the cable enters the slit of the brake retainer and the groove of the brake and the pulley is positioned over the cable. The trolley is then lowered to seat the pulley on the cable. The brake is then rotated so that the groove therein faces upward, thereby locking the suspended cable within the tubular brake retainer.

The frame also includes a longitudinal slot forward of the clevis/handle assembly mounting point that is generally parallel to the axis of the tubular brake retainer. The frame also includes a linear array of evenly-spaced apertures that is beneath and parallel to the longitudinal slot. A lever arm adjustment bracket is attached to the frame with a retainer pin that passes through both arms of the U-shaped suspension bracket, allowing the lever arm adjustment bracket to be moved back and forth within the longitudinal slot. The suspension bracket has a pair of locking apertures, which are alignable with any of the apertures in the linear array. The lever arm adjustment bracket may be locked in place by inserting a locking pin through the pair of locking apertures and through one of the apertures in the linear array. The farther forward the lever arm adjustment bracket is located, the greater the pressure applied by the brake to the suspension cable. The position of the lever arm adjustment bracket is selected in accordance with the weight of the rider and the maximum desired speed of the ride. Thus, for any rider, the closer the lever arm adjustment bracket is to the handle/clevis assembly, the greater the maximum speed. Conversely, the farther the lever arm adjustment bracket is from the handle/clevis assembly, the slower the maximum speed.

The nose of the frame is downwardly slanted and has mounted thereon a bumper made of a durable polymeric material such as Teflon®, nylon, or high-density polyethylene. At the end of the ride, the nose engages a V-shaped trap that is slidable on the suspended cable against one or more unloaded coil springs that are concentrically installed on weighted bushings on the suspended cable. As the nose of the frame engages the V-shaped trap, it is pushed down, thereby increasing the pressure between the brake and the suspended cable and, at the same time, accelerating the weighted bushings and compressing the coil springs. These features ensure that even if the pressure of the brake against the suspended cable is not properly adjusted before the ride begins, the rider will stop safely before reaching the end of the suspended cable.

BRIEF DESCRIPTION OF THE DRAWINGS

FIG. 5 is a top plan view of the upper cable support tower of FIG. 2;

FIG. 6 is a top plan view of the lower cable support tower of FIG. 3;

FIG. 11 is a side elevational view of a trolley, trap and coil spring assemblies installed on the suspended cable near the lower end thereof; and FIG. 12 is a bottom planar view of the trap.

PREFERRED EMBODIMENT OF THE INVENTION

Figure 1:
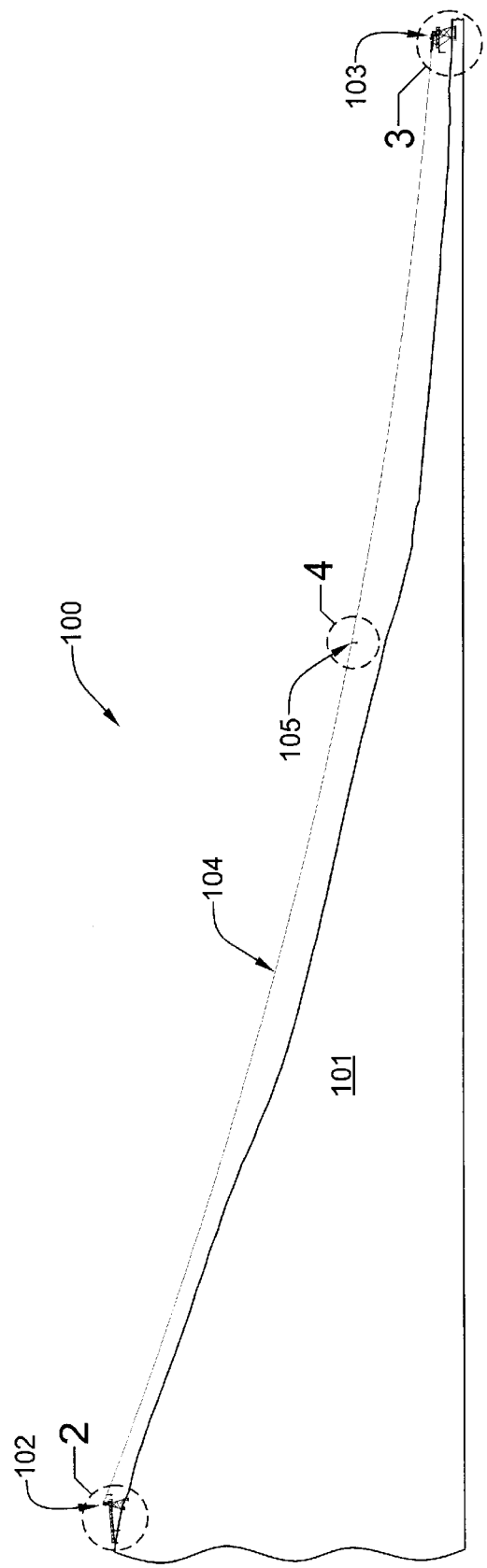
FIG. 1 is a side elevational view of the new zip line system of FIG. 1.

The zip line thrill ride system will now be described with reference to the accompanying drawing figures. It is to be understood that the drawing figures are meant to be only illustrative, that they are not necessarily drawn to scale, and that some details, which would be obvious to those of ordinary skill in the art, may have been omitted in the interest of simplification and brevity.

Referring now to FIG. 1, a new zip line thrill ride system 100 has been built on a steep hill at Park City, Utah. This drawing figure shows the approximate topography of the terrain 101 on which the ride is built. The zip line thrill ride system includes an upper cable support tower 102, a lower cable support tower 103, at least one cable 104 that is suspended between the upper cable support tower 102 and the lower cable support tower 103, and a plurality of trolleys 105 which may be reversably coupled to the cable 104. Each of the suspended cables 104 of the Park City, Utah zip ride is about 805 meters in length (0.5 mile), and the vertical drop is approximately 183 meters (600 feet). Although maximum speeds in excess of 90 m.p.h. are attainable on the system, the maximum speed experienced by paying riders is automatically limited by the equipment to no more than about 70 m.p.h. Certain components and features of the zip line thrill ride system 100 are the subjects of this patent.

Figure 2:
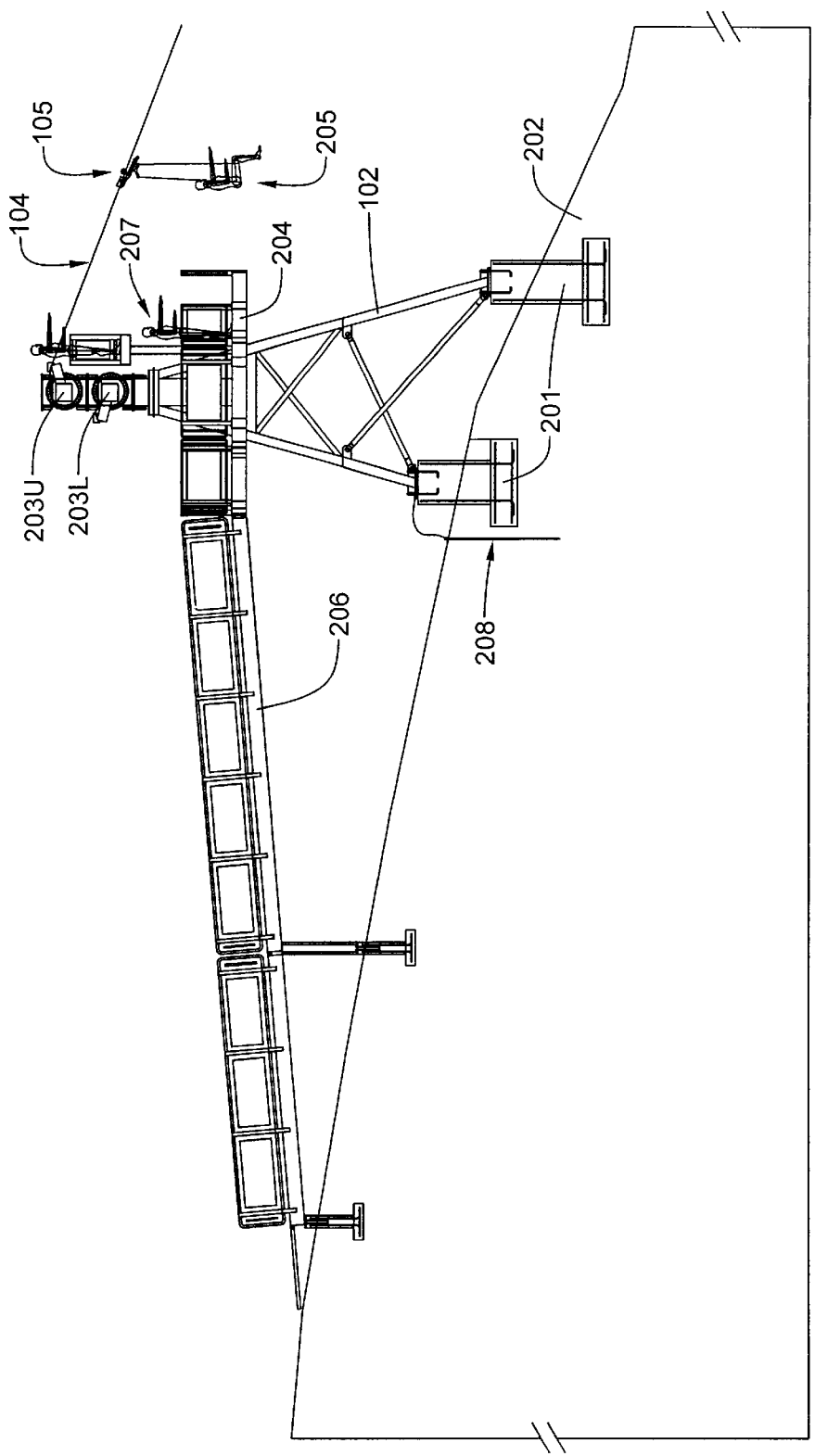
FIG. 2 is an enlarged side elevational view of the upper cable support tower that is shown in region 2 of FIG. 1.

Referring now to FIG. 2, the upper cable support tower 102 is erected on concrete piers 201 which are embedded in the hillside 202. The upper cable support tower 102 incorporates upper and lower cable anchor spools 203U and 203L, around which the upper end of cable 104 is wrapped and secured. The cable support tower 102 also incorporates a launching platform 204, from which riders 205 are launched on the ride. A high-elevation access ramp 206 is connected to the launching platform 204, and permits both ride operators 207 and riders 205 to easily ascend to and descend from the launching platform 204. It will be noted that a lightning rod 208 couples the upper cable support tower 102 to the ground, and protects the ride operators 207 and riders 205 from lightning which may strike either the upper cable support tower 102, the lower cable support tower 103, or the cable 104.

Figure 3:
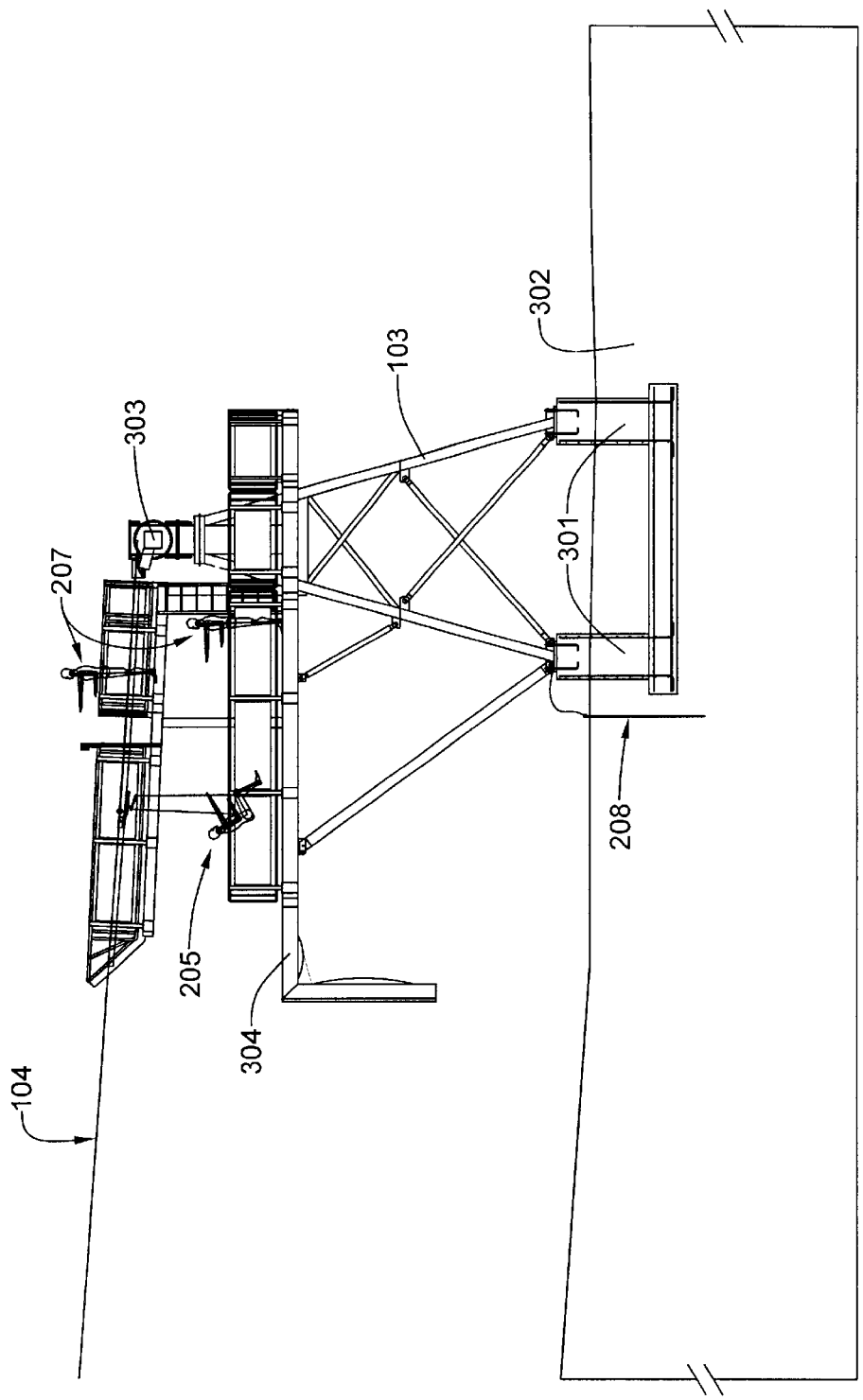
FIG. 3 is an enlarged side elevational view of the lower cable support tower that is shown in region 3 of FIG. 1.

Referring now to FIG. 3, the lower cable support tower 103 is erected on concrete piers 301 which are embedded in the ground 302. The lower cable support tower 103 incorporates single cable anchor spools 303, around which the lower end of cable 104 is wrapped and secured. The lower cable support tower 103 also incorporates a unloading platform 304, on which riders 205 are deposited at the end of the ride. A low-elevation access ramp (see FIG. 5) is connected to the unloading platform 304, and permits both ride operators 207 and riders 205 to easily ascend to and descend from the unloading platform 304. As with the upper cable support tower 102, a lightning rod 208 provides a solid ground connection as a protection against lightning strikes.

Figure 4:
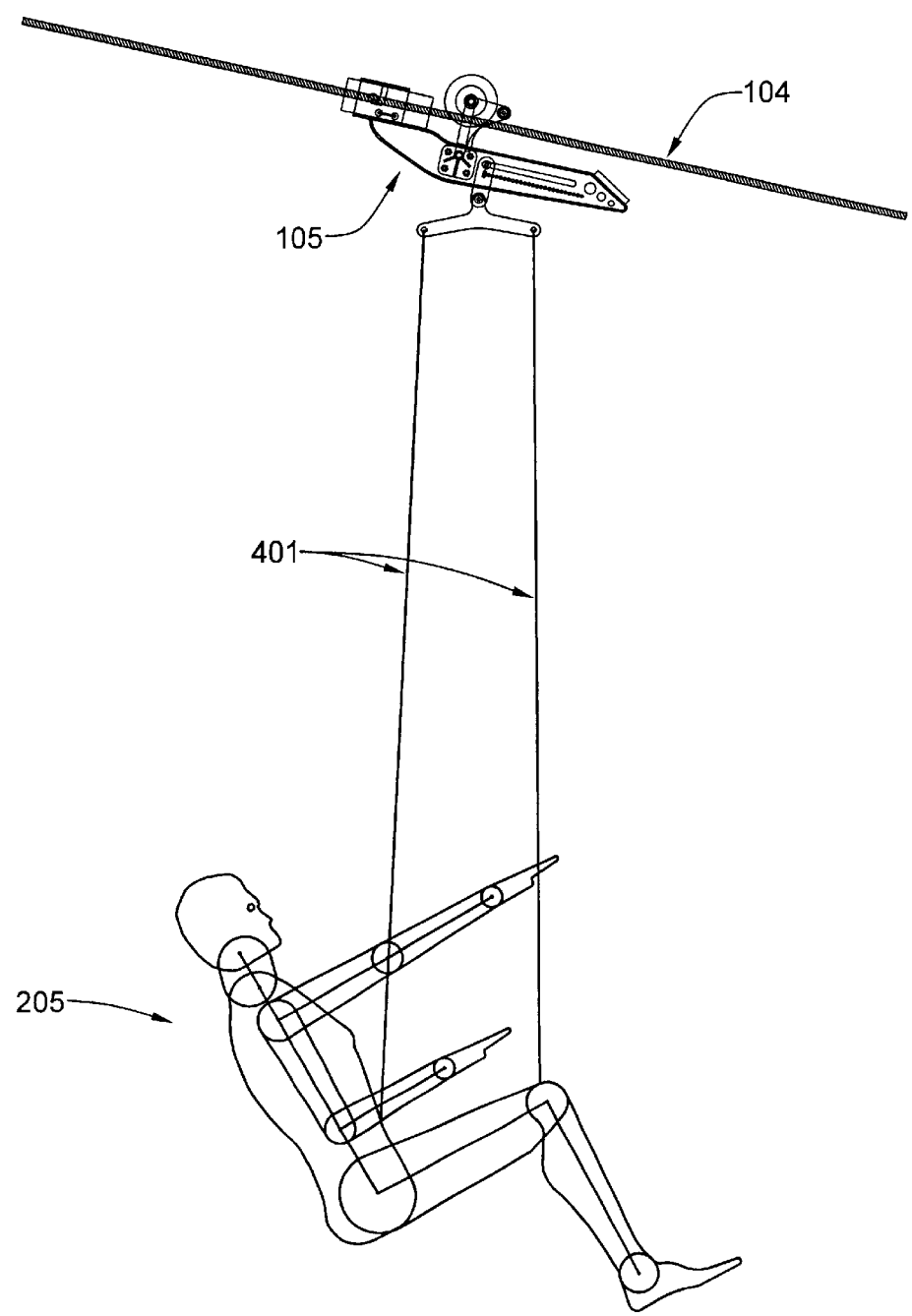
FIG. 4 is an enlarged side elevational view of the rider shown in region 4 of FIG. 1, the rider being coupled to the suspended cable via a trolley.
Figure 7:
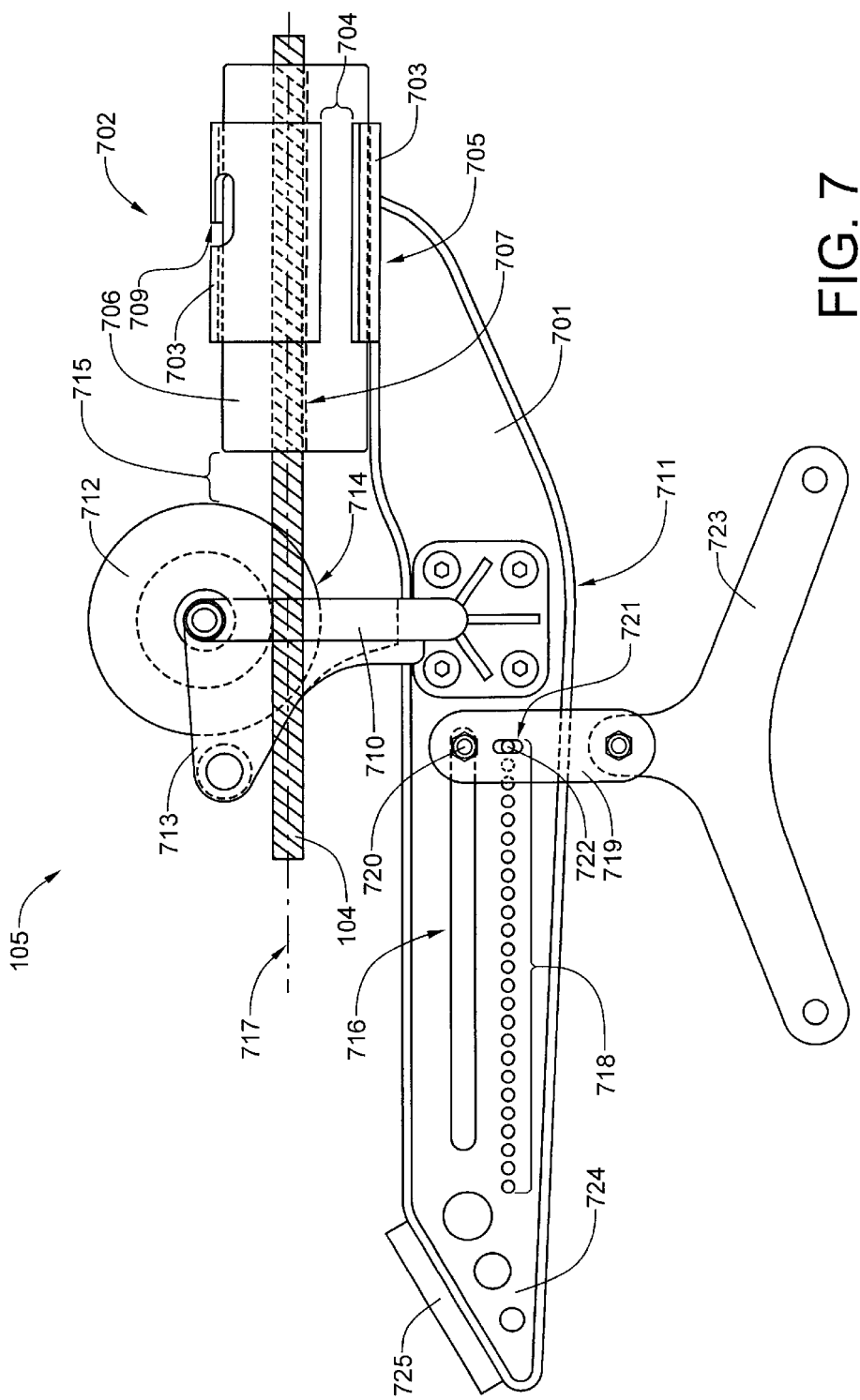
FIG. 7 is a right-side elevational view of a trolley fabricated in accordance witht the present invention.
Figure 8:
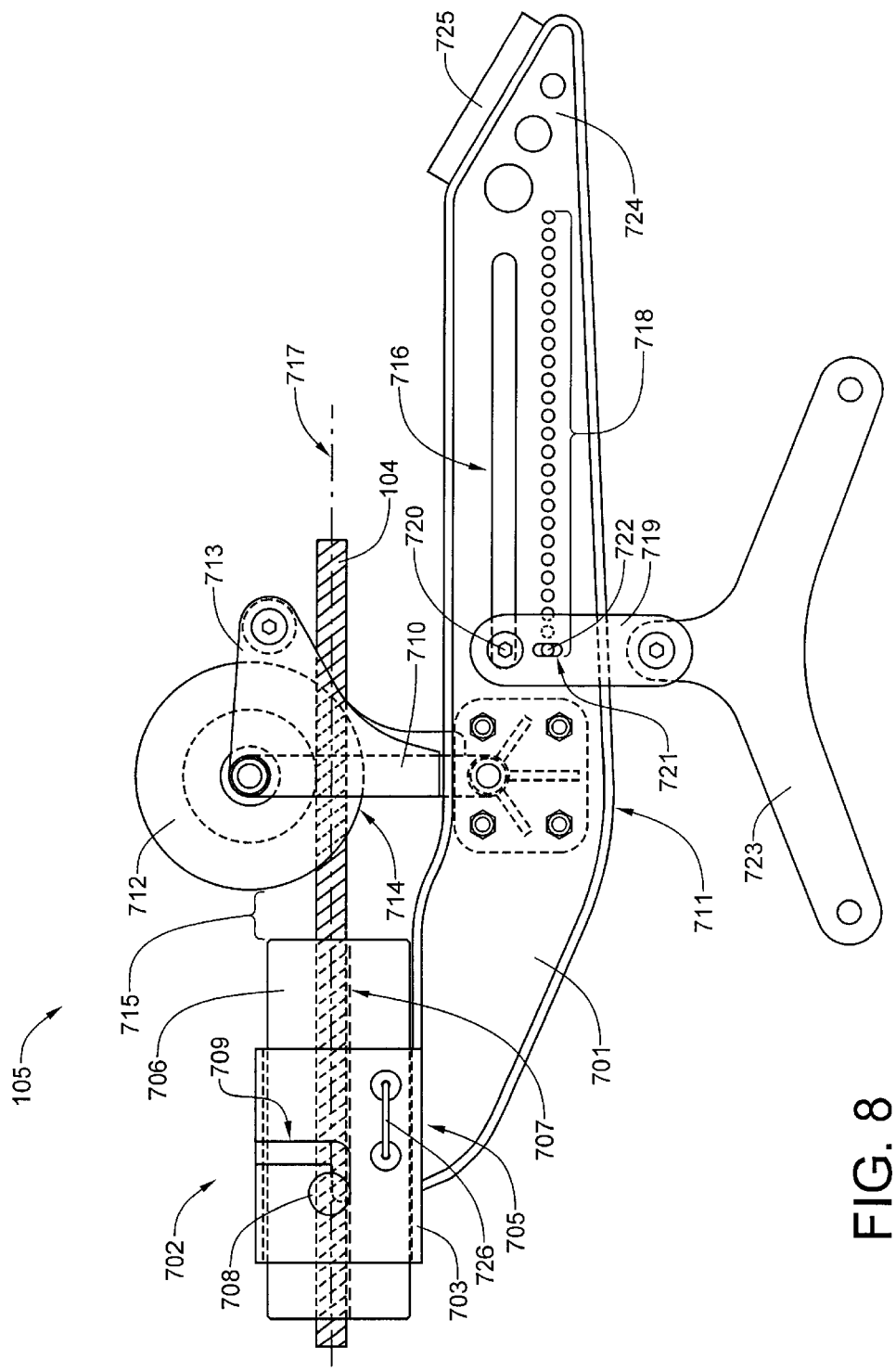
FIG. 8 is a left-side elevational view of the trolley of FIG. 7.
Figure 10:
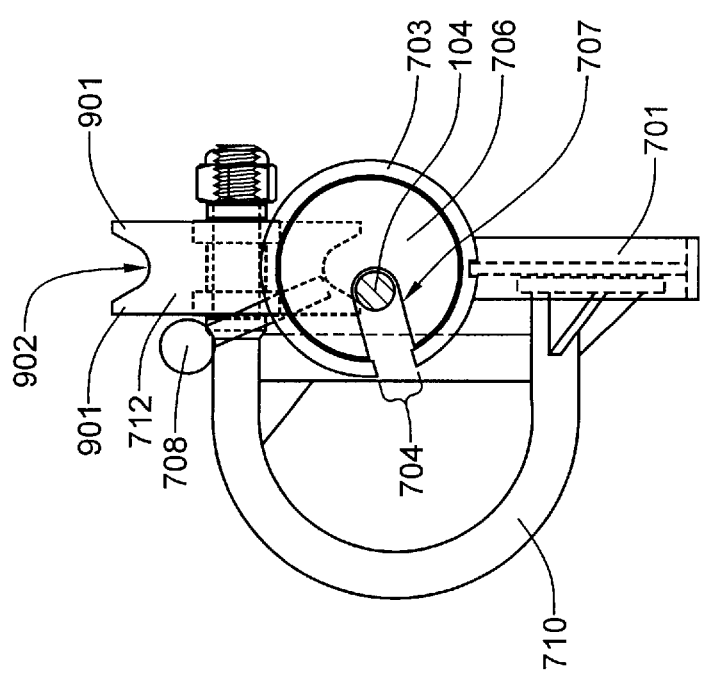
FIG. 10 is a front elevational view of the trolley of FIG. 7.
Figure 9:
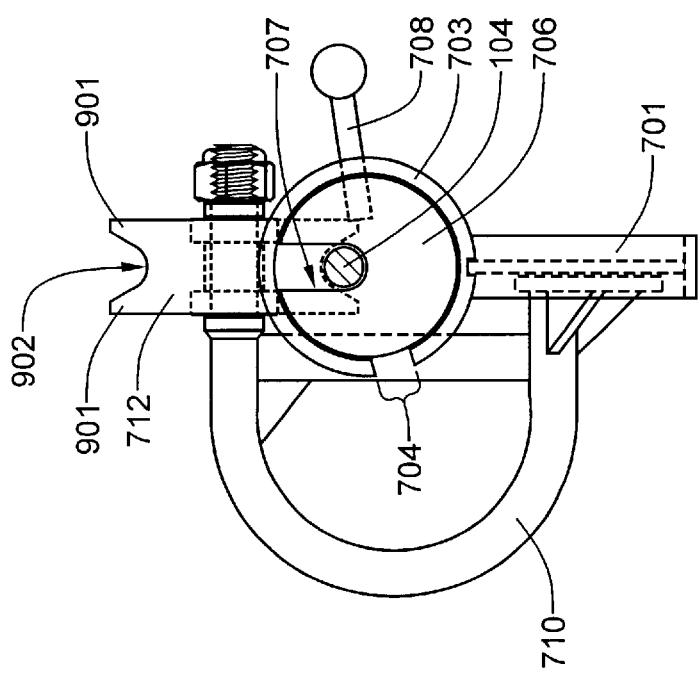
FIG. 9 is a rear elevational view of the trolley of FIG. 7.

Referring now to FIG. 4, a rider 205 is suspended by support cables 401 from a trolley 105. A rear harness (not shown) supports the rider's buttocks, while a forward harness (also not shown) supports the rider's legs near the knee joint.

Referring now to FIGS. 5 and 6, it will be noted that both the upper cable support tower 102 and the lower cable support tower 103 are equipped to support four suspended cables 104, thereby permitting four riders to careen simultaneously down the hillside 202.

Referring now specifically to FIG. 5, the high-elevation access ramp 206 is clearly visible in this drawing figure, as are the four piers 201 which support the upper cable support tower 102.

Referring now specifically to FIG. 6, the low-elevation access ramp 601, which is coupled to the side of the unloading platform 304 of the lower cable support tower 103, is clearly visible in this view.

Referring now to FIGS. 7 through 10, the trolley 105 is designed to quickly engage and disengage the cable 104. Structural components of the trolley 105, which are fabricated almost entirely from stainless steel, includes a frame 701 of generally I-beam cross section fabricated from metal plate stock. A brake assembly 702 includes a generally tubular brake retainer 703, having a longitudinal slit 704 therein, that is welded to an upper rear portion 705 of the frame 701. The brake assembly 702 also includes a generally cylindrical brake 706, fabricated from a durable polymeric material, such as Teflon®, nylon, or high-density polyethylene (HDPE), and having a longitudinal groove 707. The cylindrical brake 706 is rotatably affixed within the tubular brake retainer 703 by means of a retainer bolt 708. The retainer bolt 708 slides within a arcuate slit 709, which permits the cylindrical brake 706 to be rotated through an arc of within a range of 90 to 120 degrees. The preferred angle is presently deemed to be about 105 degrees. When the trolley 105 is affixed to the suspended cable 104, the bottom of longitudinal groove 707 rides against the lower surface of the suspended cable 104 and generates friction, which maintains ride speeds within safe limits. A clevis/handle assembly 710 is bolted to a central portion 711 of the frame 701. A pulley 712 is rotatably mounted within the clevis/ handle assembly 710. A clevis bracket 713 of the clevis/handle assembly 710 is positioned so that a lower portion 714 of the pulley 712 is exposed.

In order to attach the trolley 105 to the suspended cable 104, the brake 706 is rotated so that its longitudinal groove 707 coincides with the longitudinal slit 704 of the tubular brake retainer 703. The trolley 105 is then positioned below and oblique or perpendicular to the suspended cable 104. The trolley 105 is then elevated so that the suspended cable 104 enters a gap 715 between the tubular brake retainer 703 and the clevis/handle assembly 710. Once the suspended cable 104 is positioned below the pulley 712, the trolley 105 is rotated in a horizontal plane so that the cable 104 enters the longitudinal slit 704 of the tubular brake retainer 703 and the longitudinal groove 707 of the brake 706 and the pulley 712 is positioned over the suspended cable 104. The trolley 105 is then lowered to seat the pulley 712 on the cable 104. The brake 706 is then rotated so that its longitudinal groove 707 faces upward, thereby locking the suspended cable 104 within the tubular brake retainer 703.

The frame 701 also includes a longitudinal slot 716, forward of the clevis/handle assembly 710, that is generally parallel to the axis 717 of the tubular brake retainer 703. The frame 701 also includes a linear array of evenly-spaced apertures 718 that is beneath and parallel to the longitudinal slot 716. A lever arm adjustment bracket 719 is permanently attached to the frame 701 with a retainer pin 720 that passes from one side of the lever arm adjustment bracket 719 to the other, and through the longitudinal slot 716, thereby allowing the lever arm adjustment bracket 719 to be adjustably moved back and forth within the longitudinal slot 716. The lever arm adjustment bracket 719 also has a pair of locking apertures 721 below the retainer pin 720, which are alignable with any of the evenly-spaced apertures 718 of the linear array. The lever arm adjustment bracket 719 may be locked in place by inserting a removable locking pin 722 through the pair of locking apertures 721 and through one of the evenly-spaced apertures 718 in the linear array. For a given rider load on the lever arm adjustment bracket 719, the farther forward the lever arm adjustment bracket 719 is located, the greater the pressure applied by the brake 706 to the suspended cable 104. The position of the lever arm adjustment bracket 719 is selected in accordance with the weight of the rider and the maximum desired speed of the ride. Thus, for any rider, the closer the lever arm adjustment bracket is to the handle/clevis assembly 710, the greater the maximum speed attained by a rider 205. Conversely, the farther the lever arm adjustment bracket 719 is from the handle/clevis assembly 710, the slower the maximum speed. A rider suspension bracket 723 is coupled to the lever arm adjustment bracket 719. The frame 701 has a downwardly slanted nose 724 on which is mounted a bumper 725 made of a durable polymeric material such as Teflon®, nylon, or high-density polyethylene (HDPE).

Referring now to FIG. 11, at the end of the thrill ride, the nose 724 of the frame 701 engages a V-shaped trap 1101 that is slidably mounted on the suspended cable 104. The interior surface 1102 of the trap 1101 is downwardly sloped to a stop 1103 that limits maximum downward travel of the nose 724. As the nose 724 engages the V-shaped trap 1101, the bumper 725 is pushed down by the interior surface 1102, thereby increasing the pressure between the brake 706 and the suspended cable 104. The trap 1101 is driven into one or more unloaded coil springs 1104 that are concentrically installed on weighted bushings 1105 on the suspended cable 104, simultaneously accelerating the weighted bushings 1105 and compressing the coil springs 1104. These features ensure that even if the pressure of the brake 706 against the suspended cable 104 is not properly adjusted before the ride begins, the rider 205 will stop safely before reaching the end of the suspended cable 104.

Referring now to FIG. 12, it will be noted that the opening 1201 seen by the nose 724 of the frame 701 is V-shaped so that the nose 724, when it reaches the interior surface 1102 of the trap 1101, is centered below the suspended cable 104.

Although only several embodiments of the improved downhill zip line thrill ride system have been heretofore described, it will be obvious to those having ordinary skill in the art that changes and modifications may be made thereto without departing from the scope and the spirit of the invention as hereinafter claimed.

What is claimed is:

1. A zip line transport system comprising:
   upper and lower support towers;
   a cable suspended between said upper and lower support towers;
   at least one trolley comprising:
      a frame;
      a generally tubular brake retainer having a central axis and first and second open ends secured to a rear portion of the frame, said brake retainer having a primary longitudinal slit in a lateral portion thereof, said primary longitudinal slit extending from said first open end to said second open end;
      a generally cylindrical abrasion-resistant brake rotatably and concentrically installed within said tubular brake retainer, said brake having a linear longitudinal groove through which the cable passes as the trolley moves along the cable, a bottom portion of said linear groove sliding against a lower surface of said cable, said longitudinal groove being both centered about a plane passing through the central axis, and alignable with the primary longitudinal slit, said cable being insertable through said primary longitudinal slit and into the longitudinal groove, said cable being locked within said brake retainer by arcuate rotation of said brake; and
      a pulley rotatably mounted above a middle portion of said frame, said pulley having both a circumferential groove that rides on the upper surface of the cable, and an axis of rotation that is generally horizontal and perpendicular to the central axis, said pulley being spaced from said brake said brake retainer so that a gap at least equal to the diameter of the cable exists therebetween; and
      a lever arm adjustment bracket affixed to a front portion of said frame, said bracket being positionable fore and aft to adjust an amount of pressure between the bottom portion of the longitudinal groove and the lower surface of said cable.

2. The zip line transport system of claim 1, wherein said brake is fabricated from a durable abrasion-resistant material selected from the group consisting of Teflon®, nylon, high-density polyethylene, and composites.

3. The zip line transport system of claim 1, wherein said brake retainer also has an arcuate slit which does not intersect the longitudinal slit, said arcuate slit having an arc within a range of 90 to 120 degrees.

4. The zip line transport system of claim 3, wherein said trolley further comprises a bolt that passes through the arcuate slit and is secured within said brake, thereby securing said brake within the brake retainer and limiting rotational movement of the brake to arcuate movement within a range of 90 to 120 degrees.

5. The zip line transport system of claim 4, wherein the arcuate slit intersects a locking longitudinal slit, said locking longitudinal slit being spaced apart from both ends of said brake retainer.

6. The zip line transport system of claim 1, wherein said frame is of generally I-beam cross-section, being fabricated from metal plate stock.

7. The zip line transport system of claim 1, which further comprises:
- a trap, having an internal ramp, that is slidably mounted on the cable near the lower cable support tower; and
- at least one coil spring assembly having a weighted bushing installed within each end thereof and concentrically installed on the cable between the trap and the lower support tower; and
- wherein said frame has a downwardly-slanted nose, on which is mounted a bumper made of a durable abrasion resistant material, said nose engaging the trap and being forced by the internal ramp to a lower level as the trolley travels down the cable and enters the trap, thereby increasing the pressure between the brake and the cable and, at the same time, transferring momentum to the trap and accelerating the weighted bushings and compressing the coil spring of said at least one coil spring assembly, as the trap slams into it.

8. The zip line transport system of claim 1, wherein the trolley is installable on the cable by:
- rotating the brake so that its longitudinal groove coincides with the slit of the tubular brake retainer;
- positioning the trolley so that the frame is below and oblique or perpendicular to the cable;
- elevating the trolley so that the cable enters the gap between the brake retainer and the pulley;
- aligning the body with the cable so that the cable enters the longitudinal slit in of the brake retainer and the longitudinal groove of the brake and the circumferential groove of the pulley is positioned directly above the cable;
- seating the circumferential groove of the pulley on the upper surface of the cable; and
- rotating the brake to lock the cable within the brake retainer.

9. A zip line transport system comprising:
upper and lower support towers;
a cable suspended between said upper and lower support towers;
at least one trolley movable along the cable, said trolley comprising:
- a frame;
- a brake assembly affixed to a rear portion of said frame, said brake assembly having an abrasion-resistant brake with a longitudinal linear groove, through which the cable passes as the trolley moves along the cable, a bottom portion of said linear groove sliding against a lower surface of said cable;
- a pulley mounting bracket attached to and extending above a central portion of said frame;
- a pulley rotatably mounted to said pulley mounting bracket, said pulley having a circumferential groove that rides on an upper surface of the cable; and
- a lever arm adjustment bracket positioned on a front portion of said frame, the rider mounting bracket being positionable fore and aft to adjust an amount of pressure between the bottom portion of the linear groove and the lower surface of said cable.

10. The zip line transport system of claim 9, wherein said front portion of said frame includes:
- a longitudinal adjustment slot, to which said lever arm adjustment bracket is slidably affixed;
- a linear array of evenly-spaced apertures that is beneath and parallel to the longitudinal slot; and
- wherein said lever arm adjustment bracket is slidably affixed to the longitudinal adjustment slot and securable to any one of the apertures of the linear array with a removable locking pin.

11. The zip line transport system of claim 9, wherein said brake assembly comprises:
- a generally tubular brake retainer having a central axis and first and second open ends secured to a rear portion of the frame, said brake retainer having a primary longitudinal slit in a lateral portion thereof, said primary longitudinal slit extending from said first open end to said second open end; and
- a generally cylindrical, abrasion-resistant brake rotatably and concentrically installed within said tubular brake retainer, said brake having a linear longitudinal groove through which the cable passes, said linear longitudinal groove being centered about a plane passing through the central axis, said longitudinal groove being also alignable with the primary longitudinal slit, said brake being fabricated from a durable, abrasion-resistant material, said brake being affixed within the tubular brake retainer and rotatable about the central axis;
- wherein said cable is positionable within the circumferential groove of said pulley below its axis of rotation and insertable through said primary longitudinal slit and into the longitudinal groove of the brake, said brake then being rotatable to lock said cable within said brake retainer.

12. The zip line transport system of claim 11, wherein said brake retainer also has an arcuate slit which does not intersect the longitudinal slit, said arcuate slit having an arc within a range of 90 to 120 degrees.

13. The zip line transport system of claim 12, wherein said trolley further comprises a bolt that passes through the arcuate slit and is secured within said brake, thereby securing said brake within the brake retainer and limiting rotational movement of the brake to arcuate movement within a range of 90 to 120 degrees.

14. The zip line transport system of claim 12, wherein the arcuate slit intersects a locking longitudinal slit, said locking longitudinal slit being spaced apart from both ends of said brake retainer.

15. A zip line transport system comprising:
upper and lower support towers;
a cable suspended between said upper and lower support towers;
at least one trolley comprising:
- a frame;
- a brake assembly affixed to a rear portion of said frame, said brake assembly having an abrasion-resistant brake with a longitudinal linear groove, through which the cable passes as the trolley moves along the cable, a bottom portion of said linear groove sliding against a lower surface of said cable;
- a pulley rotatably mounted to a middle portion of said frame, said pulley having a circumferential groove that rides on an upper surface of the cable; and
- a lever arm adjustment bracket positioned on a front portion of said frame, the rider mounting bracket being positionable fore and aft to adjust an amount of pressure between the bottom portion of the linear groove and the lower surface of said cable.

16. The zip line transport system of claim 15, wherein said abrasion-resistant brake is fabricated from a material is selected from the group consisting of Teflon®, nylon, high-density polyethylene, and composites.

17. The zip line transport system of claim 15, wherein said brake assembly comprises:

a generally tubular brake retainer having a central axis and first and second open ends secured to a rear portion of the frame, said brake retainer having a primary longitudinal slit in a lateral portion thereof, said primary longitudinal slit extending from said first open end to said second open end;

wherein said brake is generally cylindrical in shape, is concentrically affixed within the tubular brake retainer, is rotatable about the central axis, and is fabricated from a durable, abrasion-resistant material;

wherein said linear longitudinal groove is centered about a plane passing through the central axis, said longitudinal groove being alignable with the primary longitudinal slit; and wherein said cable is positionable within the circumferential groove of said pulley below its axis of rotation and insertable through said primary longitudinal slit and into the longitudinal groove of the brake, said cable being lockable within said brake retainer by rotating said brake.

18. The zip line transport system of claim 17, wherein said brake retainer also has an arcuate slit which does not intersect the longitudinal slit, said arcuate slit having an arc within a range of 90 to 120 degrees.

19. The zip line transport system of claim 18, wherein said trolley further comprises a bolt that passes through the arcuate slit and is secured within said brake, thereby securing said brake within the brake retainer and limiting rotational movement of the brake to arcuate movement within a range of 90 to 120 degrees.

20. The zip line transport system of claim 18, wherein the arcuate slit intersects a locking longitudinal slit, said locking longitudinal slit being spaced apart from both ends of said brake retainer.

* * * * *